United States Patent
Mariotti et al.

(10) Patent No.: US 9,518,641 B2
(45) Date of Patent: Dec. 13, 2016

(54) TRANSMISSION SYSTEM WITH DEVICE FOR REGULATING THE GEAR CHANGE CURVE

(71) Applicant: PIAGGIO & C. S.p.A., Pontedera, Pisa (IT)

(72) Inventors: Walter Mariotti, Pisa (IT); Paolo Nesti, Pisa (IT)

(73) Assignee: PIAGGIO & C. S.p.A., Pontedera, Pisa (IT)

( * ) Notice: Subject to any disclaimer, the term of this patent is extended or adjusted under 35 U.S.C. 154(b) by 0 days.

(21) Appl. No.: 14/364,255

(22) PCT Filed: Dec. 12, 2012

(86) PCT No.: PCT/IB2012/057207
§ 371 (c)(1),
(2) Date: Jun. 10, 2014

(87) PCT Pub. No.: WO2013/098689
PCT Pub. Date: Jul. 4, 2013

(65) Prior Publication Data
US 2014/0315670 A1 Oct. 23, 2014

(30) Foreign Application Priority Data
Dec. 13, 2011 (IT) ................ MI2011A2250

(51) Int. Cl.
*F16H 59/00* (2006.01)
*F16H 61/00* (2006.01)
(Continued)

(52) U.S. Cl.
CPC ............. *F16H 9/12* (2013.01); *F16H 55/563* (2013.01); *F16H 61/66245* (2013.01); *F16H 63/067* (2013.01)

(58) Field of Classification Search
CPC ........ F16H 55/63; F16H 55/56; F16H 63/067; F16H 61/66245; F16H 63/062
(Continued)

(56) References Cited

U.S. PATENT DOCUMENTS 3,698,256 A * 10/1972 Albertson ................ 474/12
3,709,052 A * 1/1973 Lassanske ................ 474/13
(Continued)

FOREIGN PATENT DOCUMENTS

EP 1 132 656 A2 12/2001
EP 1 262 690 A2 12/2002
(Continued)

OTHER PUBLICATIONS

International Search report for corresponding International Patent Application No. PCT/IB2012/057207 mailed Feb. 28, 2013.

*Primary Examiner* — Henry Liu
(74) *Attorney, Agent, or Firm* — Merchant & Gould P.C.

(57) ABSTRACT

A continuously variable transmission system for a motorcycle includes a first drive sheave (12) operated by a transmission half-shaft (14) and a second driven sheave, connected by a V-belt. The drive sheave (12) has a first half-sheave (16) and a second half-sheave (18) substantially conical, sliding axially aligned, joined in rotation. The first half sheave (16) is fitted internally with a speed regulator composed of centrifugal masses (20) which move to cause the axial shift in the direction of extension of the transmission half-shaft (14), of the first half-sheave (16) relative to the corresponding second half-sheave (18). A device (10) for regulating the gear change curve is provided with an electromechanical actuator to cause selective intervention of a determined group of centrifugal masses (20) to vary, for the same number of revs of the engine, the centrifugal force needed to achieve the axial shift of the first half-sheave (16).

13 Claims, 8 Drawing Sheets

(51) Int. Cl.
*F16H 63/00* (2006.01)
*F16H 9/12* (2006.01)
*F16H 61/662* (2006.01)
*F16H 55/56* (2006.01)
*F16H 63/06* (2006.01)

(58) Field of Classification Search
USPC .................................. 474/11, 12, 13, 14, 15
See application file for complete search history.

(56) References Cited

U.S. PATENT DOCUMENTS

| | | | |
|---|---|---|---|
| 3,939,720 A * | 2/1976 | Aaen et al. | 474/14 |
| 3,958,461 A * | 5/1976 | Aaen et al. | 474/14 |
| 4,458,318 A * | 7/1984 | Smit et al. | 701/51 |
| 5,326,330 A * | 7/1994 | Bostelmann | 474/13 |
| 5,361,744 A * | 11/1994 | Teraoka | 123/561 |
| 5,460,575 A * | 10/1995 | Berto | 474/14 |
| 5,529,544 A * | 6/1996 | Berto | 474/11 |
| 6,050,911 A * | 4/2000 | Feuchter et al. | 474/12 |
| 6,406,390 B1 * | 6/2002 | Roby | 474/14 |
| 6,733,406 B2 * | 5/2004 | Kitai et al. | 474/13 |
| 6,958,024 B2 * | 10/2005 | Takano | 474/14 |
| 6,962,543 B2 * | 11/2005 | Roby | 474/39 |
| 7,090,600 B2 * | 8/2006 | Lohr | 474/14 |
| 7,163,477 B1 * | 1/2007 | Sherrod | 474/14 |
| 7,235,035 B2 * | 6/2007 | Korenjak et al. | 477/174 |
| 7,276,004 B2 * | 10/2007 | Wu et al. | 474/13 |
| 7,771,300 B2 * | 8/2010 | Starkey et al. | 474/14 |
| 8,052,556 B2 * | 11/2011 | Hartley | 474/46 |
| 8,409,039 B2 * | 4/2013 | Beyer | 474/14 |
| 8,668,623 B2 * | 3/2014 | Vuksa et al. | 477/80 |
| 2002/0119846 A1 * | 8/2002 | Kitai et al. | 474/14 |
| 2002/0155909 A1 * | 10/2002 | Roby | 474/14 |
| 2005/0064968 A1 * | 3/2005 | Robert | 474/13 |
| 2005/0221927 A1 * | 10/2005 | Chonan | 474/15 |
| 2005/0239585 A1 * | 10/2005 | Nishida et al. | 474/19 |
| 2006/0258492 A1 * | 11/2006 | Wu et al. | 474/13 |
| 2006/0264279 A1 * | 11/2006 | Starkey et al. | 474/18 |
| 2008/0096704 A1 * | 4/2008 | Hartley | 474/11 |
| 2009/0227404 A1 * | 9/2009 | Beyer | 474/14 |
| 2014/0004984 A1 * | 1/2014 | Aitcin | 474/14 |

FOREIGN PATENT DOCUMENTS

| | | |
|---|---|---|
| EP | 1 420 195 A2 | 5/2004 |
| WO | WO 2006/119227 A2 | 11/2006 |

* cited by examiner

TRANSMISSION SYSTEM WITH DEVICE FOR REGULATING THE GEAR CHANGE CURVE

This application is a National Stage Application of PCT/IB2012/057207, filed 12 Dec. 2012, which claims benefit of Serial No. MI2011A002250, filed 13 Dec. 2011 in Italy and which applications are incorporated herein by reference. To the extent appropriate, a claim of priority is made to each of the above disclosed applications.

FIELD OF THE INVENTION

The present invention relates to a transmission system, in particular a transmission system for motorcycles of the continuously variable type, fitted with a device for regulating the gear change curve.

BACKGROUND OF THE INVENTION

The expansible sheave and V-belt continuously variable transmission (or CVT) is a type of automatic gearbox for vehicles in which the transmission ratio can change without a break between two limit values. The CVT is widely used in small and medium powered two-wheel vehicles, in particular mopeds. The reasons for such extensive diffusion are to be sought in the advantages offered by this type of transmission in terms of:
economical production;
ease of construction and maintenance;
performance and reliability.

Recent progress in the technology of materials has further permitted the development of new types of belts, based on the use of polymer supports reinforced with high resistance and flexible fibres and textiles, and characterised by high performance in terms of transmissible power and performance.

The use of such belts, together with a general increase in knowledge of the functioning of this type of transmission, related primarily to the progressive build-up of experience accumulated by the manufacturers, has permitted significant increases in performance to be achieved both in terms of operating reliability and of efficiency.

The continuous speed control performs its function of changing the transmission ratio by making the winding diameters of the belt on two pulleys vary, of which one is the drive force and the other is driven. The motion coming from the drive shaft is transmitted by said two pulleys, at least one of which is able to draw together or distance the two parts or half-sheaves of which it is composed. This way the belt finds itself working at a higher or lower point of the sheave, thereby varying the transmission ratio. The belt being non-extensible and the distance between the sheaves being invariable, the minimum ratio (long gear) is obtained when the belt is in a minimum diameter condition on the drive sheave and maximum diameter on the driven sheave, while the maximum ratio (high gear) is obtained, conversely, when the belt rides on the maximum diameter of the drive sheave and minimum diameter of the driven sheave. The method of varying the aperture of the sheaves, which thus influences the gear change, provides the gear change law/for which the CVT is designed.

This type of automatic transmission is by now quite common for all the main transmission manufacturers, both as a functional and constructional layout. The drive sheave usually comprises a speed regulator made with centrifugal masses (rollers) which have the purpose of performing the aperture of the respective half-sheaves. The driven group instead comprises a sheave formed of the respective half-sheaves connected to each other by means of a simple contrast spring (motorcycle type CVT); or by means of a spring and a corrector or torque servo gear (moped type CVT). The automatic clutch, of the centrifugal mass type, is positioned in the driven group.

As well as this centrifugal transmission solution, there is also an electromechanical system on the market composed again of two sheaves and a connection belt between them, but with the novelty of an electric motor being introduced, accompanied by sophisticated electronic operation. The movement of the mobile half-sheave on the primary shaft is actuated by the electric motor and not by the weight of the blocks housed therein, as instead happens with traditional transmissions. This way the ratio can be managed as desired, according to the "map" loaded in the control unit of the electric motor.

The characterisation of a vehicle's drive unit, as regards pollutant emissions, currently constitutes a fundamental aspect of its development. Increasingly strict anti-pollution laws imposing limits on emission values, in fact often constitute a crucial constraint when defining the parameters for the global design and development of a drive unit.

The purpose of the present invention is therefore to make a transmission system, in particular a transmission system for motorcycles of the continuously variable type, fitted with a device for regulating the gear change curve which is able to reduce both fuel consumption and the pollutant emissions of the motorcycle.

A further purpose of the invention is to make a transmission system with device for regulating the gear change curve which is able to increase the adaptability of the motorcycle to the rider's needs.

A further purpose of the invention is to make a transmission system with device for regulating the gear change curve which is particularly simple and economical to make.

Further characteristics of the invention are highlighted in the dependent claims which form an integral part of the present description.

SUMMARY OF THE INVENTION

In brief, the present invention relates to an implementation of a general continuously variable transmission unit, wherein the presence of a regulator or control device permits the characteristics of the transmission gear change to be chosen so as to selectively obtain a "sports" or power mode or "touring" or economy mode of driving. Such control device causes the selective intervention of one specific group of rollers or another, as if the transmission were working with a specific number of rollers of varying weight.

When the control device is on, only a certain number of rollers of the drive half-sheave are activated. As a result, the transmission unit remains in the longer gears for a longer time and a greater centrifugal force is therefore required to permit the extension of the transmission belt. In such configuration the driving mode makes the motor "rev." with gear change performed at a higher number of revs.

A "sports" mode use of the vehicle ensues, centred on maximum performance especially in terms of acceleration.

Vice versa, when the control device is off, the speed control unit works with all the rollers present in the half-sheave containing them, permitting a more marked "touring" setting of the speed control unit and thereby permitting improved driving at low speeds and when performing manoeuvres, as well as an increase in mileage, all to the benefit of reduced consumption and pollutant emissions.

The control device may be configured in various modes, for example as regards the number of rollers intervening in the axial shift of the drive sheave and the number of rollers which are, instead, blocked. Also as regards the type (direct, indirect) and nature (mechanical, electrical, magnetic, pneumatic, etc) of the control device various alternatives may be taken into consideration. FIG. 1 below shows two examples of the gear change curve of a vehicle fitted with a continuously variable transmission implemented by the device for regulating the gear change curve according to the present invention.

The use of the device for regulating the gear change curve according to the present invention thus permits a reduction of fuel consumption and of pollutant emissions to be achieved acting solely on the vehicle transmission. Instead of acting on the actual drive unit by means of operations upstream (fuel supply, combustion) or downstream (catalytic process) of the cylinder, the device according to the invention acts in fact on the continuously variable transmission system by means of the possibility of modifying the gear change parameters. In addition to this aspect, as already emphasised, the device according to the invention makes it possible to vary the "feel" of driving the vehicle, passing from a sports mode to a more touring mode.

BRIEF DESCRIPTION OF THE DRAWINGS

The characteristics and advantages of a transmission system with device for regulating the gear change curve according to the present invention will be more clearly evident from the following description made by way of a non-limiting example with reference to the appended drawings wherein.

DETAILED DESCRIPTION OF THE INVENTION

Figure 1:
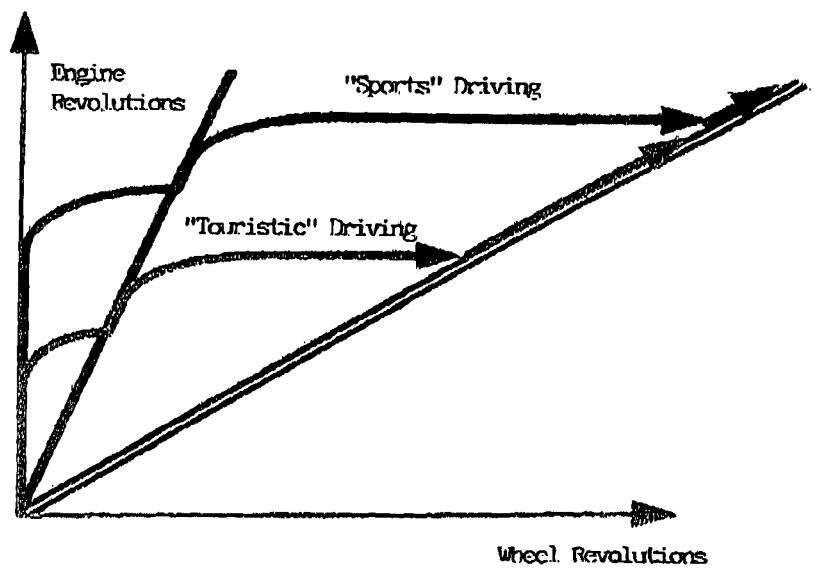
FIG. 1 is a graph showing two examples of the gear change curve of a vehicle fitted with a transmission system with a device for regulating the gear change curve according to the present invention.
Figure 2:
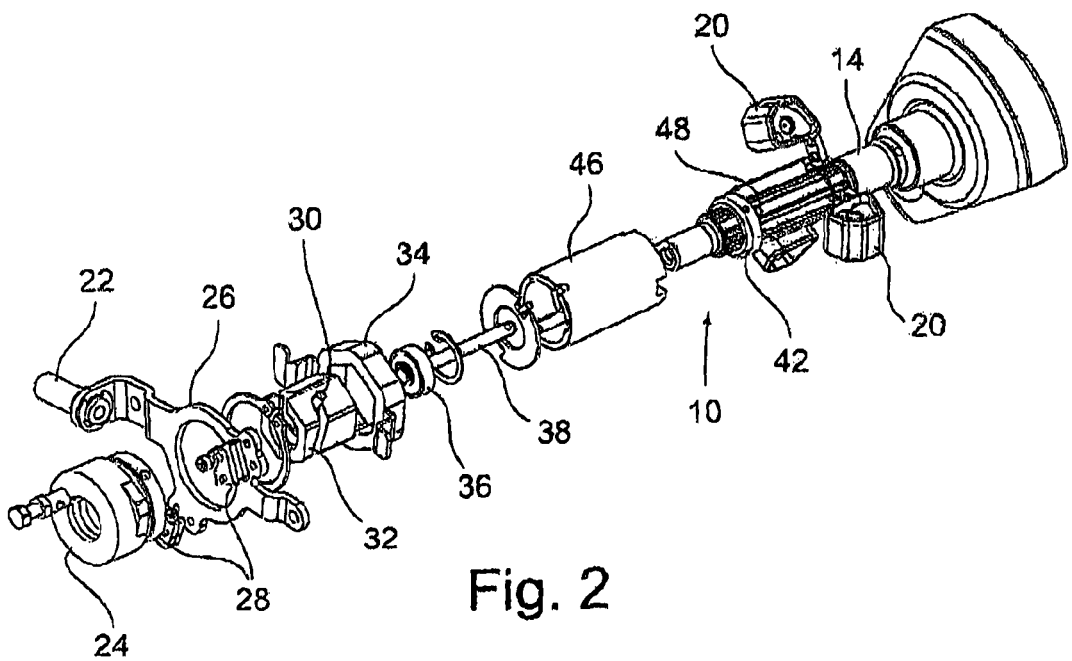
FIG. 2 is an exploded view of a preferred embodiment of the device for regulating the gear change curve according to the present invention.
Figure 3:
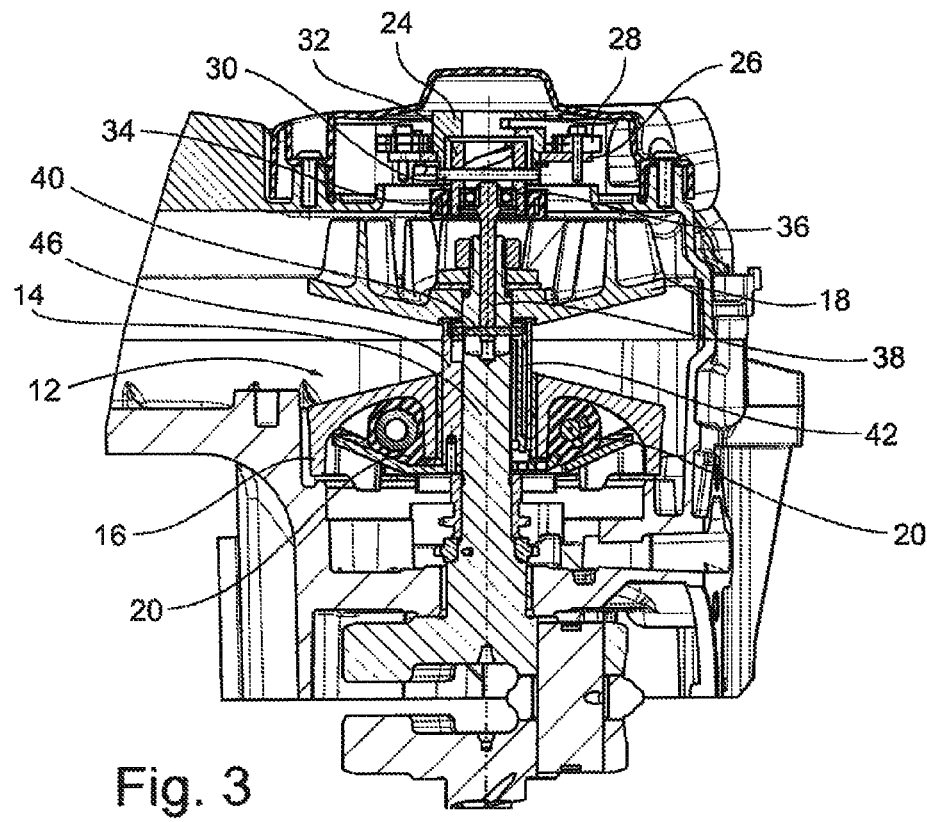
FIG. 3 is a cross-section view of the device for regulating the gear change curve in FIG. 2 applied to a continuously variable transmission system.
Figure 4:
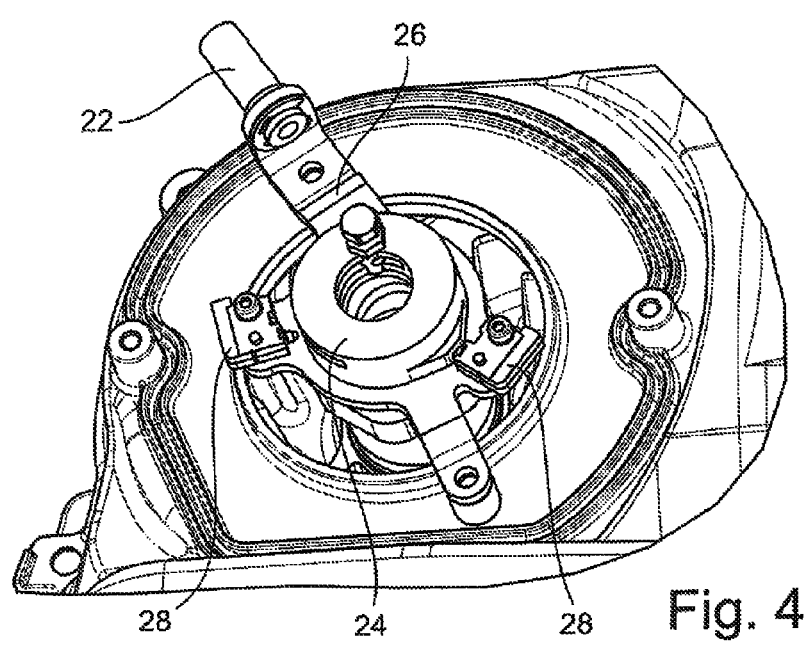
FIG. 4 is a perspective view of the device for regulating the gear change curve in FIG. 2, fitted on the casing of the continuously variable transmission group.

With reference to the figures, a preferred embodiment of the continuously variable transmission system with device for regulating the gear change curve according to the present invention is shown, wherein such regulating device is globally denoted by reference numeral 10. The continuously variable transmission system, configured to be applied preferably to a two or three-wheeled motorcycle, is of the type composed of a first drive sheave 12, driven by a dedicated transmission half-shaft 14 and by a second driven sheave (not shown), connected to each other by a V-belt. At least the drive sheave 12 is composed in turn of a first half-sheave 16 and a second half-sheave 18 substantially conical, sliding on the same axis, joined in rotation.

The first half-sheave 16 of the drive sheave 12 is internally provided with a speed regulator composed of a plurality of centrifugal masses 20 able to cause the axial shift, in the direction of extension of the transmission half-shaft 14, of said first half-sheave 16 in relation to the corresponding second half-sheave 18. This way, by moving the two drive half-sheaves 16 and 18 together, the rotation diameter of the belt is increased which being unable to vary in length thereby simultaneously reduces the rotation diameter on the driven sheave, thus lengthening and shortening the transmission ratio. The device 10 is of the electromechanical type and can be configured, in the embodiment shown, to pass from a configuration wherein only three centrifugal masses or rollers 20 can be activated (gear change at higher engine speed) or all six centrifugal masses or rollers 20 (gear change at lower engine speed) present inside the first drive half-sheave 16 of the continuously variable transmission system can be activated, as will be described further below. It is in any case possible to realise a different control for actuating the regulation of the rollers 20 and/or actuating a different group of rollers 20, on condition that a balanced drive sheave group 12 is made, that is to say with all the rollers 20 angularly equidistant.

The actuation of the passage from one functioning configuration to another has been conceived primarily so as to facilitate the rider, that is to say, with a command present on the handlebar to activate/deactivate the device 10. The switchover is possible below a certain engine speed, such as to keep the transmission system in the configuration with the rollers 20 at their minimum radius, that is to say at the minimum distance from each other, inside the first drive half-sheave 16 (initial starting position in FIG. 10a). The information on the engine speed can be read from the electronic control panel fitted on the vehicle.

Based on the embodiment shown in the figures, the device 10 comprises an electric line actuator (not shown) which commands, by means of a connection wire 22, the rotation of a command sheave 24 centred on a support plate 26 fixed to the casing of the transmission group. Alternatively to the concave back-geared command connection 22 and cam, another type of command could also be used, such as an axial direct command. A pair of proximity sensors 28, joined to the support plate 26, provide the electronic control panel of the vehicle with the device 10 status (engaged/disengaged).

Figure 5A:
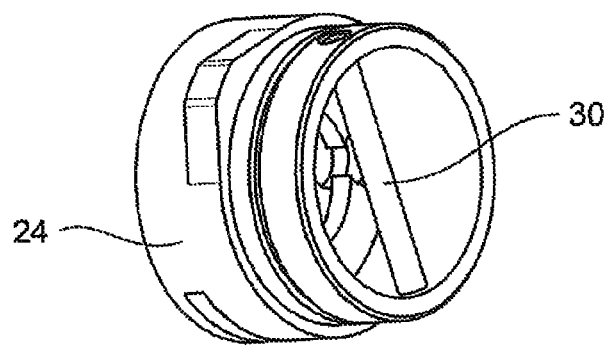
FIGS. 5a-5c respectively show some of the components (command sheave of the desmodromic slider, desmodromic slider with thrust pin and anti-rotation plate of the desmodromic slider) of the device for regulating the gear change curve in FIG. 2.
Figure 5B:
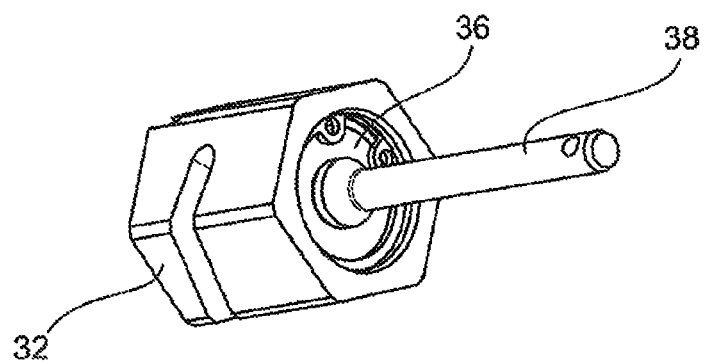
Figure 5C:
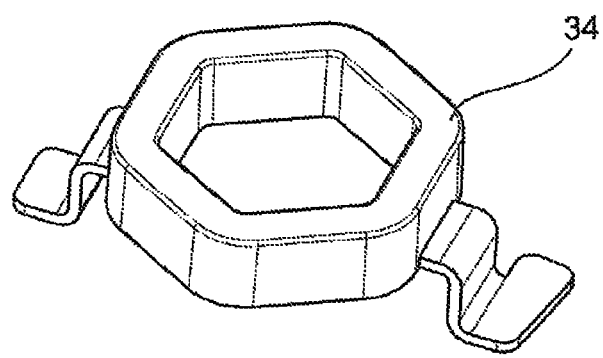
Figure 6:
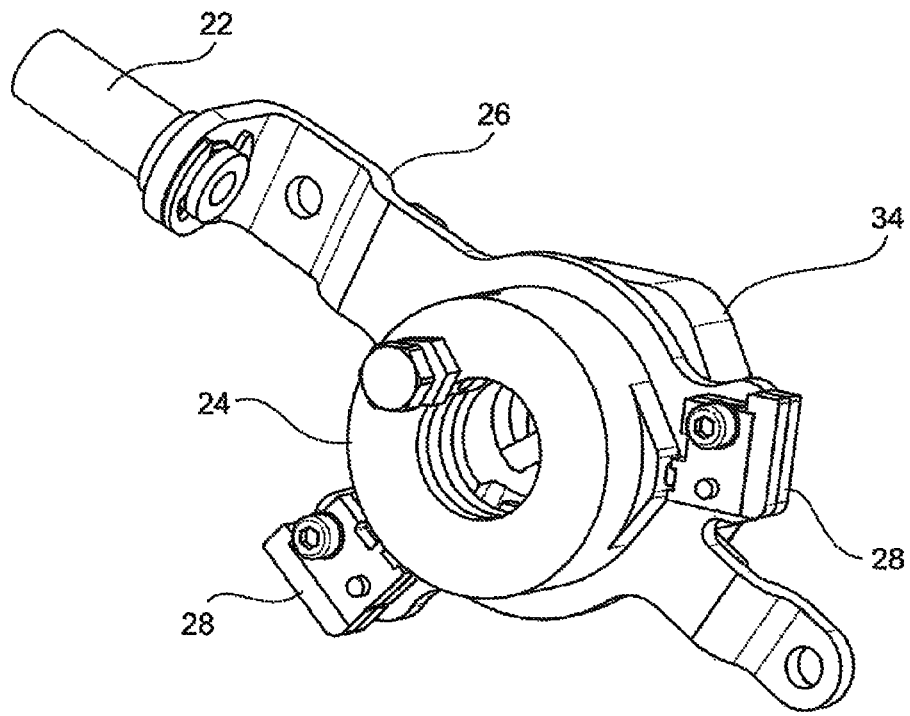
FIG. 6 is a perspective view of the command unit of the device for regulating the gear change curve in FIG. 2.

A transversal pin 30 (FIG. 5a) is forced onto the command sheave 24 which finds a guide track in a helical recess made in a desmodromic slider 32 having a non-circular cross-section (for example hexagonal, FIG. 5b). For said desmodromic slider 32 the only possibility of movement is to shift axially along its axis, which coincides with the axis of the transmission half-shaft 14, being obstructed in rotation by a dedicated fixed guide plate 34 (FIG. 5) bearing on is central part a hole, also non-circular and such as to form an anti-rotational constraint. FIG. 6 shows the command group assembly of the device 10, which transforms the rotation movement of the command sheave 24 into the translation movement of desmodromic slider 32.

Figure 7A:
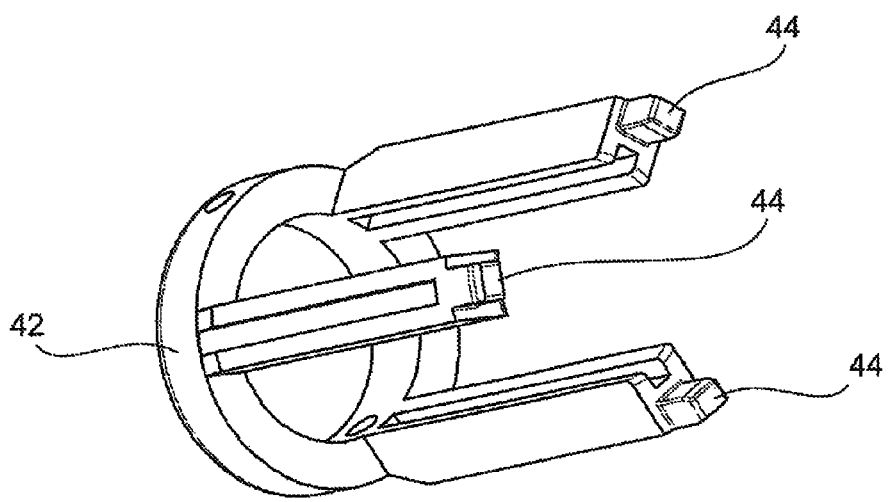
FIGS. 7a and 7b show further components (three point attachment fork and spacer bushing) of the device for regulating the gear change curve in FIG. 2.

The desmodromic slider 32 is made integral, by the interposition of a bearing 36, to a command rod 38 sliding inside the transmission half-shaft 14 and fitted, at its end opposite to that which the desmodromic slider is positioned on, with a radial plate 40. The radial plate 14 is in turn made integral with a fork sleeve 42 (FIG. 7a) fitted with a number of appendages (arms) 44 equal to the number of rollers which the device 10 is able to command. In the example shown, the fork sleeve 42 is fitted with three arms 44 positioned at 120° to each other in such a way as to command three respective rollers 20 of the first drive half-sheave 16.

The axial thrust of the desmodromic slider 32 is thus transmitted to the command rod 38 and to the relative radial plate 40, which in turn transmits such axial thrust to the fork sleeve 42.

Figure 7B:
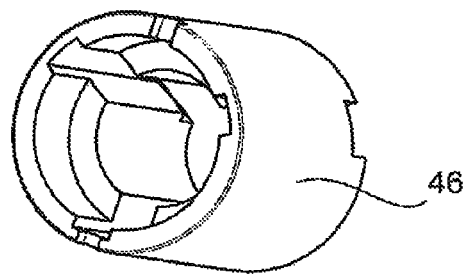
Figure 8:
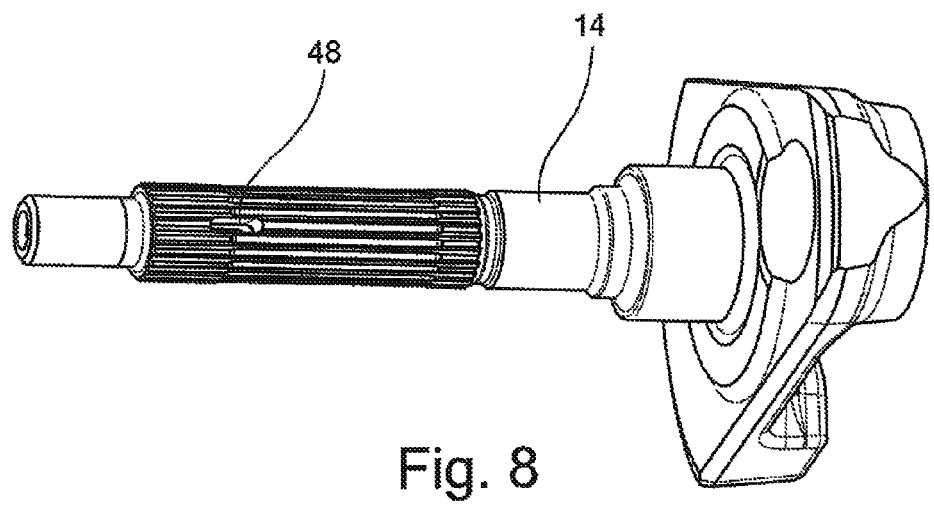
FIG. 8 is a perspective view of the transmission half-shaft of the continuously variable transmission system.

The arms 44 of the fork sleeve 42 slide axially inside a spacer bushing 46 (FIG. 7b), around which the first drive half-sheave 16 shifts axially, and thus find themselves positioned between said spacer bushing 46 and the transmission half-shaft 14. The radial plate does not carry the transmission half-shaft 14 in translation, in that it shifts along a slot 48 (FIG. 8) made on said transmission half shaft 14.

Figure 9A:
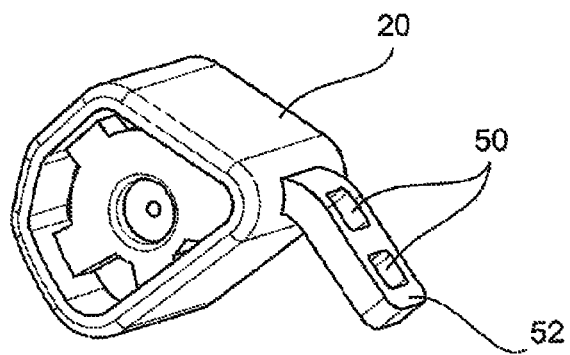
FIGS. 9a and 9b respectively show two separate centrifugal rollers of the drive sheave of the continuously variable transmission system.
Figure 9B:
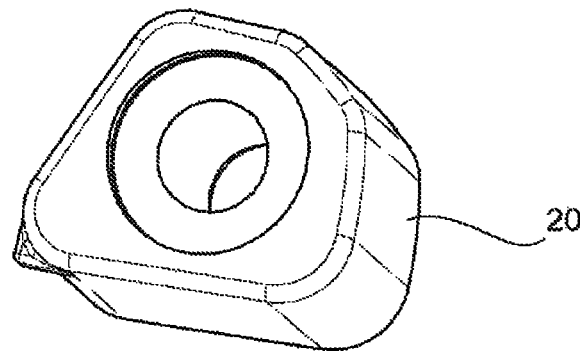

The arms 44 of the fork sleeve 42, following the axial shift conferred, engage in corresponding holes 50 made in the coupling feet 52 (FIG. 9a) of those rollers 20 configured to contribute more or less to the shift of the first drive half-sheave 16. In detail, in the case of engagement of the arms 44 with the coupling feet 52, only the rollers 20 without such engagement feet 52 will take part in the shifting of the first drive half sheave 16. In the case rather of disengagement of the arms 44 from the coupling feet 52, all the rollers 20 (six in the embodiment shown) will be shifted in their tracks by centrifugal force and thus operate the first drive half-shave 16. This way it is possible to modify the trend of the gear change law, passing from the high rotation speed of the motor (sports/power) to a lower rotation speed (touring/economy).

The rollers 20 have a metallic body covered in plastic material to facilitate their sliding along the tracks of the first drive half-sheave. The rollers 20 operatively connectable to the device 10 are also suitably shaped to receive the coupling feet 52 for the engagement/disengagement with said device 10. The fact of having made the rollers 20 in two groups of three (FIGS. 10 and 11) is merely one possible choice of calibration of the transmission system. A certain weight will thus be had when the three rollers 20 without coupling feet 52 are active, or a different weight when all six rollers 20 present inside the first drive half sheave 16 intervene.

As already specified above, increasing the weight of the rollers 20 will increase the centrifugal force for the same number of revs of the motor, or the same centrifugal force and thus consequent pressure on the sides of the belt will be achieved at lower rotation speeds. In particular, the minimum load for beginning to overcome the contrast of the driven sheave group, and thereby perform the gear change, is reached in advance. Increasing therefore the weight of the rollers 20 the change is performed at a lower number of revs of the motor and vice versa.

Figure 10A:
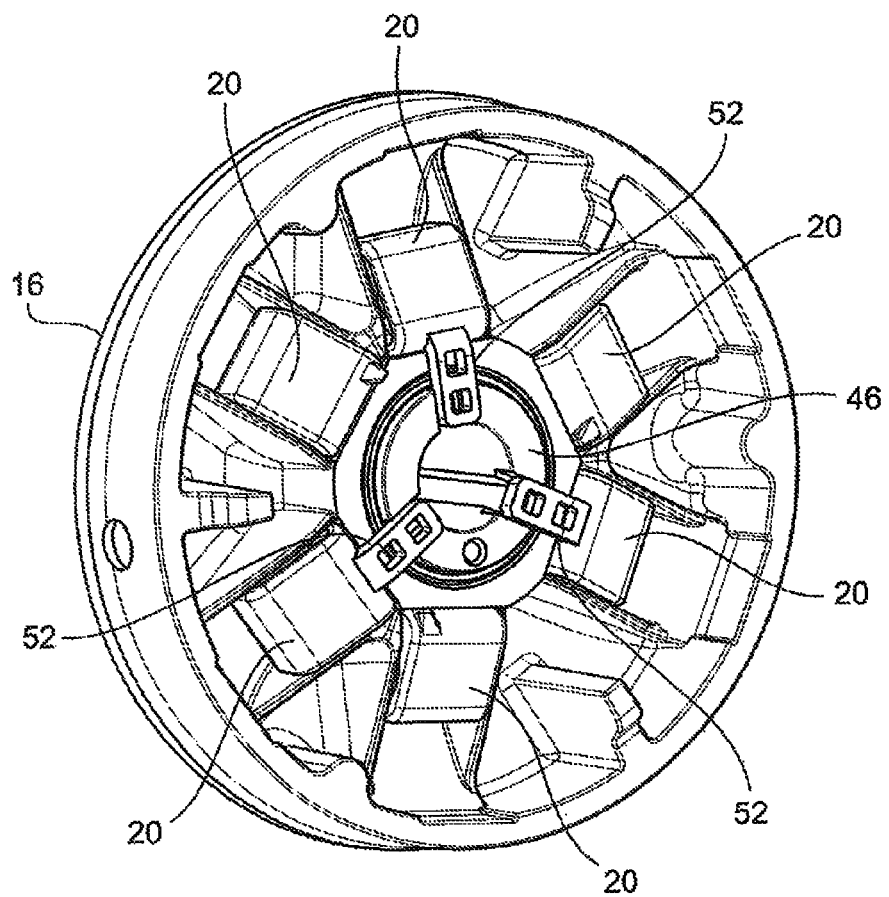
FIGS. 10a-10c show, in three different functioning configurations, the drive half-sheave of the transmission system to which the device for regulating the gear change curve in FIG. 2 is applied.
Figure 10B:
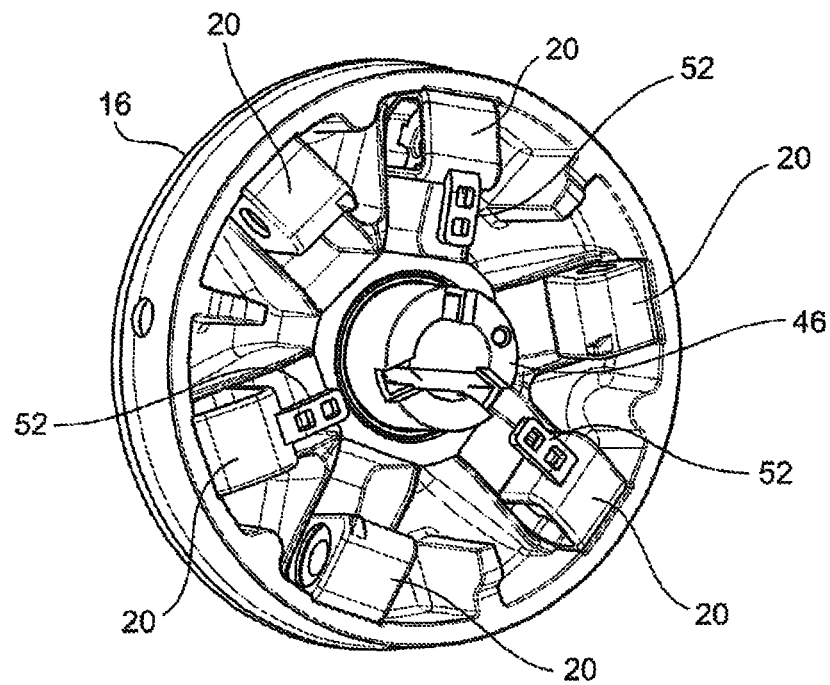
Figure 10C:
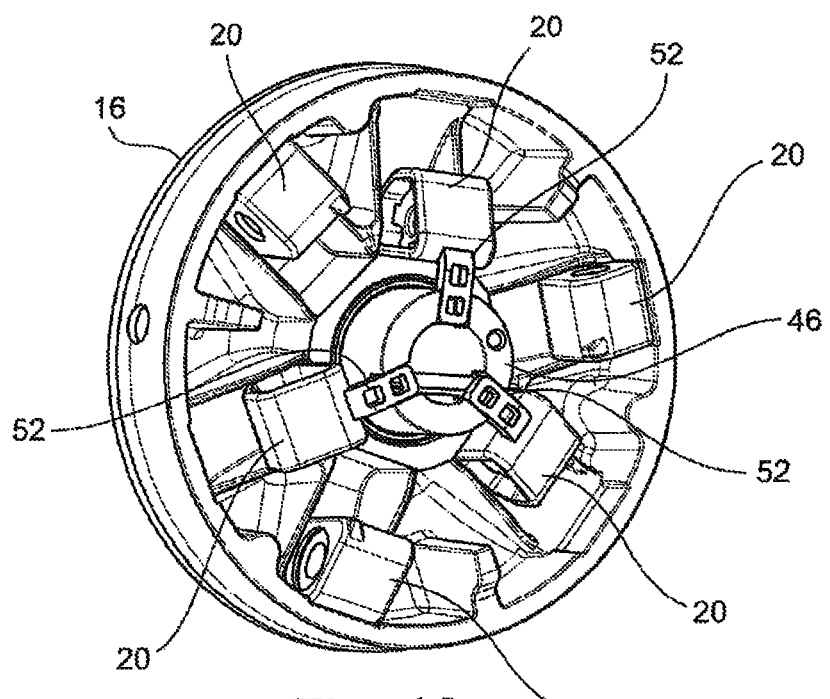

FIGS. 10a-10c show the first drive half-sheave 16 of the transmission system in three different functioning configurations.

In detail, in FIG. 10a the configuration is shown in which all the rollers 20 are at a minimum distance from each other, or "minimum diameter" configuration.

FIG. 10b shows the configuration in which all the rollers 20 are at a maximum distance from each other, or "maximum diameter" configuration. Such configuration corresponds to a high gear following a gear change curve of the economy type, suitable for touring (FIG. 1)

Figure 11A:
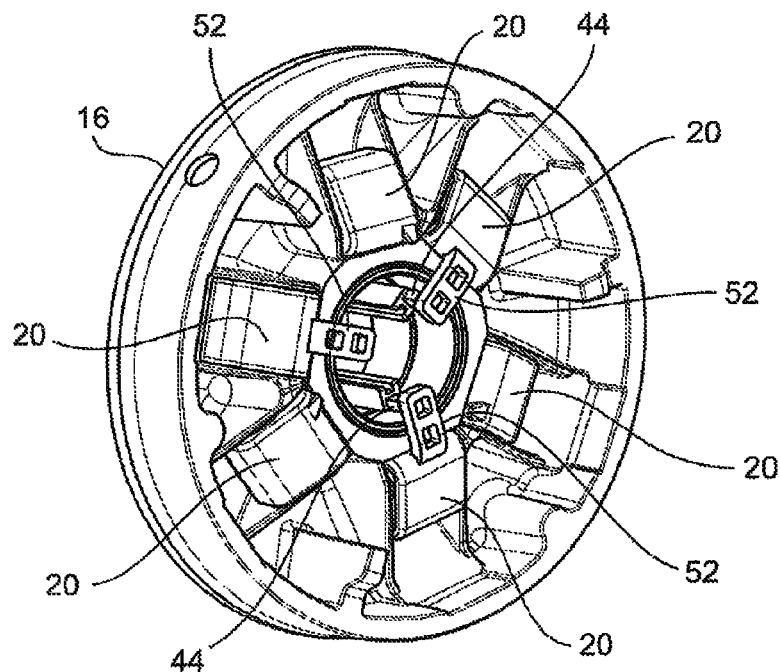
FIGS. 11a and 11b show the type of coupling, on the feet of the centrifugal rollers of the drive half-sheave, of the device for regulating the gear change curve in FIG. 2.
Figure 11B:
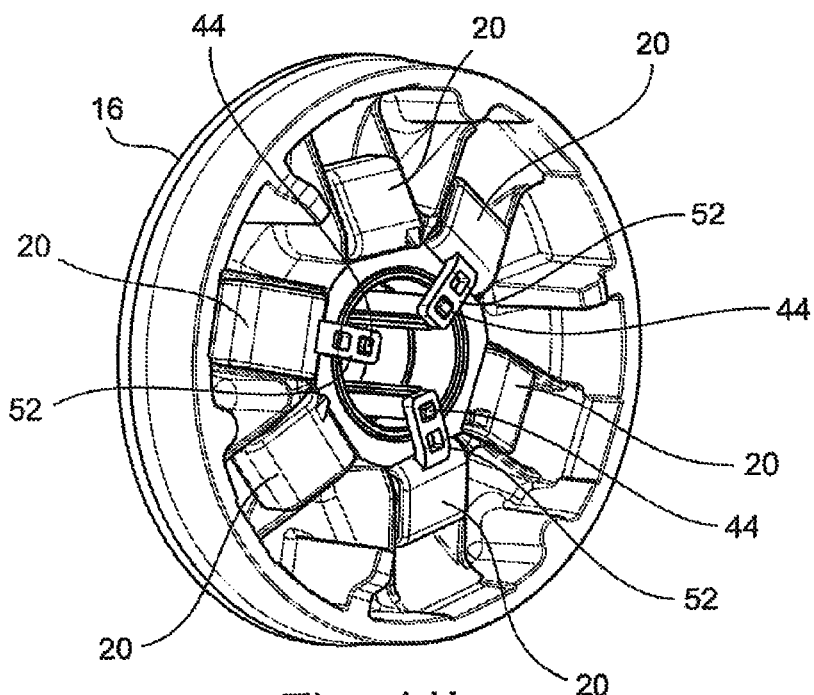

FIG. 10c shows the configuration in which the three active rollers 20, that is to say those not constrained to the device 10, are at a maximum distance from each other or "maximum diameter" configuration. Such configuration corresponds to a long gear following a gear change curve of the power type, suitable for sports driving (FIG. 1) In such configuration the device 10 for regulating the gear change, preventing the shift by centrifugal force of the other three rollers 20 along the relative tracks has cut in. In FIGS. 10b and 10c it may be seen how the first drive half sheave 16 has shifted axially on the dedicated spacer bushing 46 during the functioning of the transmission system in the high gear mode. FIGS. 11a and 11b respectively show, instead, the moment in time when the three variable intervention rollers 20 are about to engage by means of the three arms 44 present on the fork sleeve 42 and the moment in time in which such engagement is completed. It has thus been seen how the transmission system with device for regulating the gear change curve according to the present invention achieves the purposes expounded above.

The transmission system with device for regulating the gear change curve according to the present invention thus conceived is in any case susceptible to numerous modifications and variations, all falling within the same inventive concept; moreover, all the parts may be replaced with technically equivalent elements. In practice the materials used, as indeed the shapes and dimensions may be varied as needed according to technical requirements. The sphere of the invention is thus defined by the appended claims.

The invention claimed is:

1. Continuously variable transmission system for a motor cycle, comprising a first drive sheave driven by a transmission half-shaft and a second driven sheave, said first drive sheave and said second driven sheave being connected to each other by a V-belt, wherein at least the first drive sheave includes a first half-sheave and a second half-sheave, substantially conical, sliding on a same axis and joined in rotation, said first half sheave being fitted internally with a speed regulator including a plurality of centrifugal masses the movement of which is able to cause an axial shift, in the direction of extension of the transmission half-shaft, of said first half-sheave in relation to the corresponding second half-sheave, a device for regulating the gear change curve provided with electromechanical actuating means for causing selective intervention of a determined group of said plurality of centrifugal masses, said determined group comprising less than all of said plurality of centrifugal masses, in such a way as to vary, for a same number of engine revolutions, centrifugal force needed to achieve the axial shift of said first half-sheave in relation to the corresponding second half-sheave.

2. Transmission system according to claim 1, wherein said electromechanical actuating means comprise a command group able to cause axial translation, in the direction of the transmission half-shaft, of a fork sleeve able to selectively engage the determined group of centrifugal masses to prevent the movement of the centrifugal masses inside said first half-sheave.

3. Transmission system according to claim 2, wherein said command group comprises a rotating command sheave able to cause the axial translation, in the direction of the transmission half-shaft, of a desmodromic slider integral with said fork sleeve.

4. Transmission system according to claim 3, wherein said command sheave is centered on a support plate fixed to a casing of a transmission group.

5. Transmission system according to claim 4, comprising a pair of proximity sensors, joined to the support plate, which provide an electronic control panel of the motorcycle with engagement or disengagement status of the device for regulating the gear change curve.

6. Transmission system according to claim 3, wherein a transversal pin is forced onto the command sheave which finds a guide track in a helical recess made in the desmodromic slider so as to transform the rotational movement of said command sheave into the translation movement of said desmodromic slider.

7. Transmission system according to claim 3, wherein said desmodromic slider has a non-circular cross-section and is constrained to move in the axial direction of the transmission half-shaft by a fixed guide plate bearing on a central part a hole, also non-circular and forming an anti-rotational constraint.

8. Transmission system according to claim 3, wherein said desmodromic slider is made integral to a command rod sliding inside the transmission half-shaft and fitted, at an end opposite to that which the desmodromic slider is positioned on, with a radial plate in turn made integral with the fork sleeve.

9. Transmission system according to claim 8, wherein said radial plate is moveable along a slot made on the transmission half-shaft.

10. Transmission system according to claim 2, wherein the fork sleeve is fitted with one or more arms engaging in corresponding holes made in a coupling foot of each centrifugal mass belonging to said determined group of centrifugal masses.

11. Transmission system according to claim 10, wherein the fork sleeve is fitted with a number of arms equal to the number of centrifugal masses which the device for regulating the gear change curve is able to command.

12. Transmission system according to claim 10 wherein said arms slide axially inside a spacer bushing, around which said first half-sheave shifts axially, said arms being positioned between said spacer bushing and the transmission half-shaft.

13. Transmission system according to claim 1, wherein said electromechanical actuating means comprise an electric line activation/deactivation actuator of the device for the regulation of the gear change curve, said electric line actuator also being, suitable for being actuated by a command positioned on the handlebar of the motorcycle.

* * * * *